Figure 3:
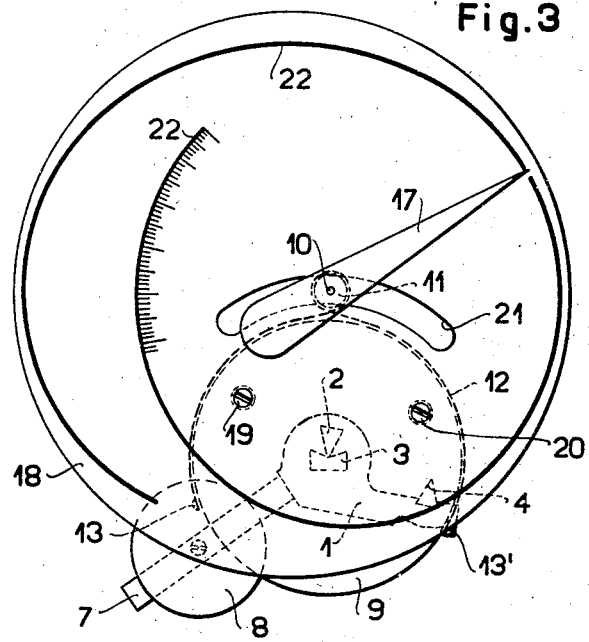

March 6, 1928.
R. JOKSCH
1,661,291
AUTOMATIC WEIGHING APPARATUS
Filed July 25, 1927
2 Sheets-Sheet 1
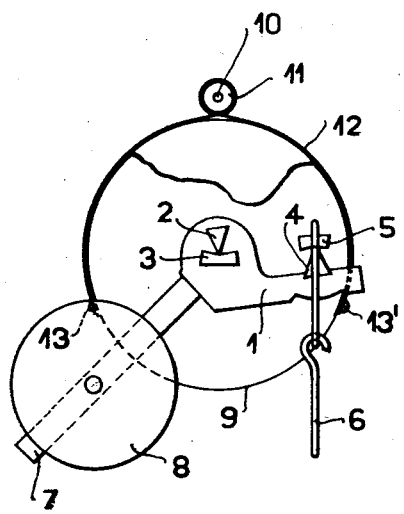
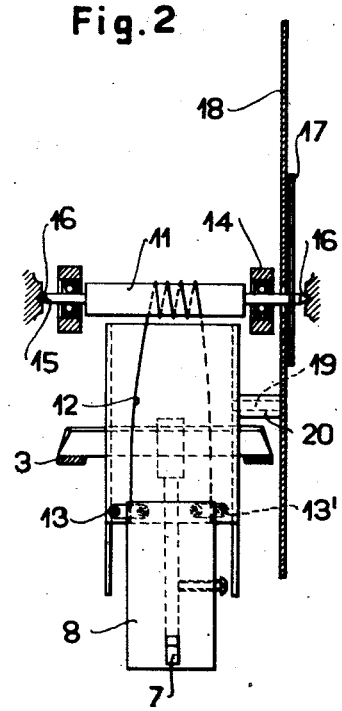
Inventor:
Rudolf Joksch March 6, 1928.

R. JOKSCH

AUTOMATIC WEIGHING APPARATUS

Filed July 25, 1927

1,661,291

2 Sheets-Sheet 2

Inventor:
Rudolf Joksch
By his Atty.

Patented Mar. 6, 1928.

1,661,291

UNITED STATES PATENT OFFICE.

RUDOLF JOKSCH, OF VIENNA, AUSTRIA.

AUTOMATIC WEIGHING APPARATUS.

Application filed July 25, 1927, Serial No. 208,154, and in Austria June 5, 1926.

This invention relates to automatic weighing apparatus with a load balancing weighted lever and particularly refers to indicator mechanisms for such an apparatus of the kind in which the movement of the load balancing lever is transmitted to the indicator by means of a gearing.

Indicator mechanisms of the kind mentioned have certain defects due to the interposition of the gearing. It is a well known fact that with every gearing a certain backlash will be experienced due to imperfect meshing of the parts and this defect is not entirely eliminated by the use of a band, chain or cord as a motion transmitting agent. The sag of the chain or cord employed causes lost motion and small movements of the lever are entirely consumed by the straightening of the chain or band which will have to be first tensioned before imparting the movement to the indicator mechanism. If these transmitting means on the contrary are mounted under high tension to eliminate sagging, the friction due to the high tension is so heavy that it exceeds the amount of small loads and the weighing apparatus will therefore not have the required sensitivity.

A further drawback in some cases and especially in cases where great sensitivity is required is that the spreading of the graduation over an arc of 360° is still insufficient if the weighing apparatus should allow the precise indication of even very small loads. Such precision can usually only be obtained by materially reducing the weighing range of the apparatus.

My invention has for its object to secure the necessary precision and sensitivity of the weighing apparatus without decreasing the weighing range and for this purpose employs an indicating mechanism which eliminates lost motion and permits spreading of the graduation over an arc of more than 360°.

I preferably employ the usual transmission by means of a drum secured to the weighing lever and operatively connected with a small drum on the indicator shaft or directly with the circumferential part of said shaft by means of a flexible chain or cord. But according to the invention, said indicator shaft is arranged closely to the periphery of the large drum so that the small drum is almost touching the same, sufficient space being only left for the chain to pass between the drums. The chain is fixed on the large drum with both ends, making a loop with one or several turns, around the small drum on the indicator shaft or directly around the shaft. Thus the chain is supported along its whole length and the sag is eliminated without necessity to apply high tension. In order to eliminate as far as possible the effect of even the very small tension still required to secure correct co-operation the indicator shaft is supported by a small ball bearing of special construction in which only rolling of the balls takes place, while security against lateral or axial displacement of the shaft is obtained by special bearing centers or by a suitable arrangement of the transmission chain, which will hold the shaft or drum laterally around which it is wound.

To obtain spreading of the graduation over an arc of more than 360° the dial over which the pointer is moved is moreover not fixed to the frame but is mounted on the weighted load balancing lever or on a part connected therewith so that it moves together with said lever and the graduation scale is thus not a circle but a cycloidal curve having a spiral like form so that the pointer will not return to the same graduation even if completing more than one revolution. To avoid confusion the graduation scale may be covered and only that part of the graduation scale upon which the hand is playing for the time being appears in a slot or window provided in such cover.

Further features of the invention will appear from the following description.

In the accompanying drawings

Figure 4:
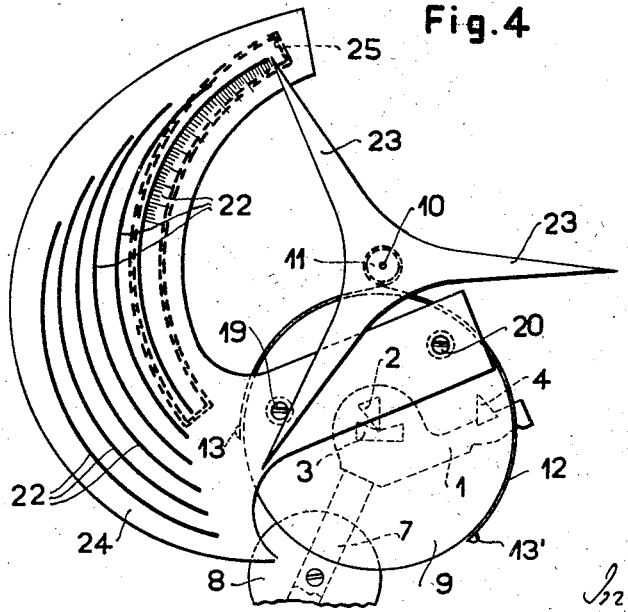

Fig. 1 shows diagrammatically the working parts of the weighing apparatus in elevation with the dial removed, Fig. 2 shows a side view of these parts, Fig. 3 shows the same view as Fig. 1 but with the dial in its place, Fig. 4 shows a modification of the invention in which a plurality of pointers is used, only the pointer and that part of the graduation scale over which it plays being however visible.

The weighing apparatus is of the automatic type using a weighted load balancing lever and may be of any approved construction. It consists of the weighing or load supporting lever 1 supported upon the knife edge 2 resting on a pan 3. Said weighing lever carries a second knife edge 4 co-operating with a pan 5 upon which the lever 6 is suspended which holds the scale pan proper not shown in the drawing in the usual manner.

The weighing lever 1 is moreover connected with the load balancing lever 7 which carries a counter-poise 8 intended to balance the load and with the drum 9 which forms part of the transmission gear actuating the indicator mechanism.

This indicator mechanism comprises the indicator shaft 10 upon which a small drum 11 is fixedly mounted and a flexible chain or cord 12 made of metal or of any suitable material, incapable of stretching. The indicator shaft 10 is mounted closely adjacent the periphery of the drum 9 in such a way that between the drum 11 seated thereon and the large drum 9 only a very small space will be left just sufficient to allow the chain or cord 12 to pass from one drum to the other.

Said chain 12 preferably consists of very small links pivotally connected with each other and it is fixed with both end on the drum 9 at 13 and 13', respectively, by means of pins or bolts. The said chain is slung around the periphery of the large drum 9 and rests upon the same practically over nearly its length with the exception of the small space between the two drums. At this place it leaves the drum 9 and forms a loop of one or more turns around the small drum 11 on the indicator shaft. During rotation of the drum 9 therefore the length of the chain resting upon the periphery does not change but only the place where the loop is formed around the drum 11 changes relatively to said periphery. The shaft 10 is mounted in ball bearings 14 which are fixed in the frame supporting the whole structure and which are of special construction or are adjusted in a special way. Usually ball bearings have a plurality of race faces some of them enclosing the balls also laterally to ensure security against lateral or axial displacement. As however the balls roll on a circle and are rotated thereby, this causes a certain amount of gliding friction on the lateral races or parts of the races, which is not of any consequence in usual constructions. However in the present case, where extreme sensitivity is required such gliding friction of the balls is not permissible as it would affect the great sensitivity required. The ball bearings 14 must therefore be constructed in such a way as to dispense with the lateral faces enclosing the balls or preferably an ordinary ball bearing is used but it is so adjusted or provided with such balls that sufficient play in lateral direction is permitted. Therefore the shaft 10 is not held axially by the bearings themselves and special means must therefore be employed to prevent lateral displacement of the same. These means consist in bearing centers 15 preferably arranged on the shaft 10 and formed by extensions of said shaft provided with conical points entering into center holes 16 in the frame. The shaft may however be held laterally also by the transmission chain itself by using a loop with more than one turn and by arranging the points of fixation 13, 13' on the large drum at a certain axial distance from each other as also shown in Fig. 2, so that the ascending and descending parts of the loop wound around the drum 11 keyed on the indicator shaft are oppositely inclined at a certain angle with respect to the axis of symmetry passing through the drums. Thereby the winding up and unwinding of the chain parts forming the loop will give rise to opposite axial forces neutralizing each other, which will firmly hold the drum 11 and the shaft 10 in its place and external casual sources of disturbance acting upon said shaft will be counteracted by the frictional forces due to the firm grip of the chain on the drum 11.

Both means may also be employed simultaneously as shown in Fig. 2 though each is in itself sufficient to hold the shaft in axial direction.

The shaft 10 carries the pointer 17, which may consist of a simple hand, the point of which moves upon the graduated scale.

The dial 18 upon which the graduation is made is not fixed in the frame but is connected with the weighing lever or preferably with the drum 9 which rotates with said lever by means of bolts 19 screwed into the front part of said drum. Short tubular distance pieces 20 preferably surround said bolts 19 so that the dial is firmly held at a suitable distance from the drum immediately behind the pointer. The dial is provided with a slot 21, which is arc shaped and through which the shaft 10 of the pointer 17 may freely pass so that the rocking movement of the dial may not be hampered by the fixed indicator shaft. The dial is provided with the graduation scale which runs along a cycloidal curve returning in the manner of a spiral, so that the pointer may make more than one revolution without returning to the same part of the graduation scale. The curve carrying the graduation is found if the path of a point located on the periphery of a circle which is rolling upon an arc is traced.

According to the further modification shown in Fig. 4 the dial may be reduced in size by arranging a plurality of pointers on the shaft 10 or by using a pointer having a plurality of arms. Only parts of the cycloidal graduation curve must in this case be drawn on the dial and the various parts may then be all drawn one behind the other on a scythe shaped dial 24 connected with the weighing lever 1.

In order to allow correct reading of the indicated mark without confusion with the other graduations not in use for the time being the casing of the weighing apparatus covers the whole front and is only provided with a slot or window 25 so arranged as to display only that part of the graduation which is in use for the time being and upon which the pointer is playing. All other parts and pointer arms are made invisible.

It will be seen from the above that the invention is particularly adapted to allow great precision in weighing and great facilities in reading the indications with accuracy without limiting the weighing range so that it removes one of the most serious drawbacks of the automatic weighing apparatus with load balancing lever, which could not be used for many purposes on account of the above defect. It is to be understood however that I do not limit myself to the construction shown as many modifications may be devised without departing from the essence of the invention.

What I claim is:—

1. An automatic weighing apparatus in which the load is balanced by a weighted lever and in which the indicator mechanism comprises a gearing imparting a rotation to the indicator shaft for more than one turn wherein the dial is connected with the weighing lever and is moving with the same in front of the rotating pointer, thus allowing graduation on a spiral like cycloidal curve which permits a rotational indication movement of more than a full turn to the pointer without returning to the same graduation mark.

2. An automatic weighing apparatus according to claim 1, wherein a number of pointers co-operates with a number of graduations each of them being arranged along parts of adjacent curves and all curves being arranged one behind the other.

3. An automatic weighing apparatus according to claim 1 comprising a casing having a slot or window therein wherein one part of the graduation appears, said slot or window being positioned to display only the graduation actually in use.

4. An automatic weighing apparatus of the type in which the load is balanced by a weighted lever and in which the indicator mechanism comprises a dial, a pointer, and a gearing consisting of two circular drums one of them connected with the weighing lever and the other with the indicator shaft, the dial being rigidly attached to the drum connected with the weighing lever and the pointer being rigidly connected to the indicator shaft, the motion of one drum being transmitted to the other by means of a chain or cord hereby characterized that the drums are arranged closely together so as to leave only a small space just sufficient to allow the chain to pass from one drum to the other and by passing the chain around the smaller drum in a loop having one or more turns, so that the chain is supported substantially over its whole length on the periphery of the drums thus eliminating the sag of the chain without applying a high tension to it.

5. An automatic weighing apparatus according to the preceding claim, wherein the indicator shaft is journalled within a ball bearing allowing lateral displacement, the axial fixation of the indicator shaft being obtained by means external to the ball bearing, to avoid frictional resistance of the ball bearing under load.

6. An automatic weighing apparatus according to claim 4 wherein the means for securing the indicator shaft against axial displacement consist in fixing both ends of the chain on the drum at a certain distance in axial direction, thus obtaining an inclination of the ascending and descending part of the loop at opposite angles.

7. An automatic weighing apparatus according to claim 4 wherein the indicator shaft is held against axial displacement by means of bearing centers and center holes arranged on the shaft and on parts of the casing respectively.

In testimony whereof I have hereunto set my hand.

RUDOLF JOKSCH.